Patented Nov. 29, 1938

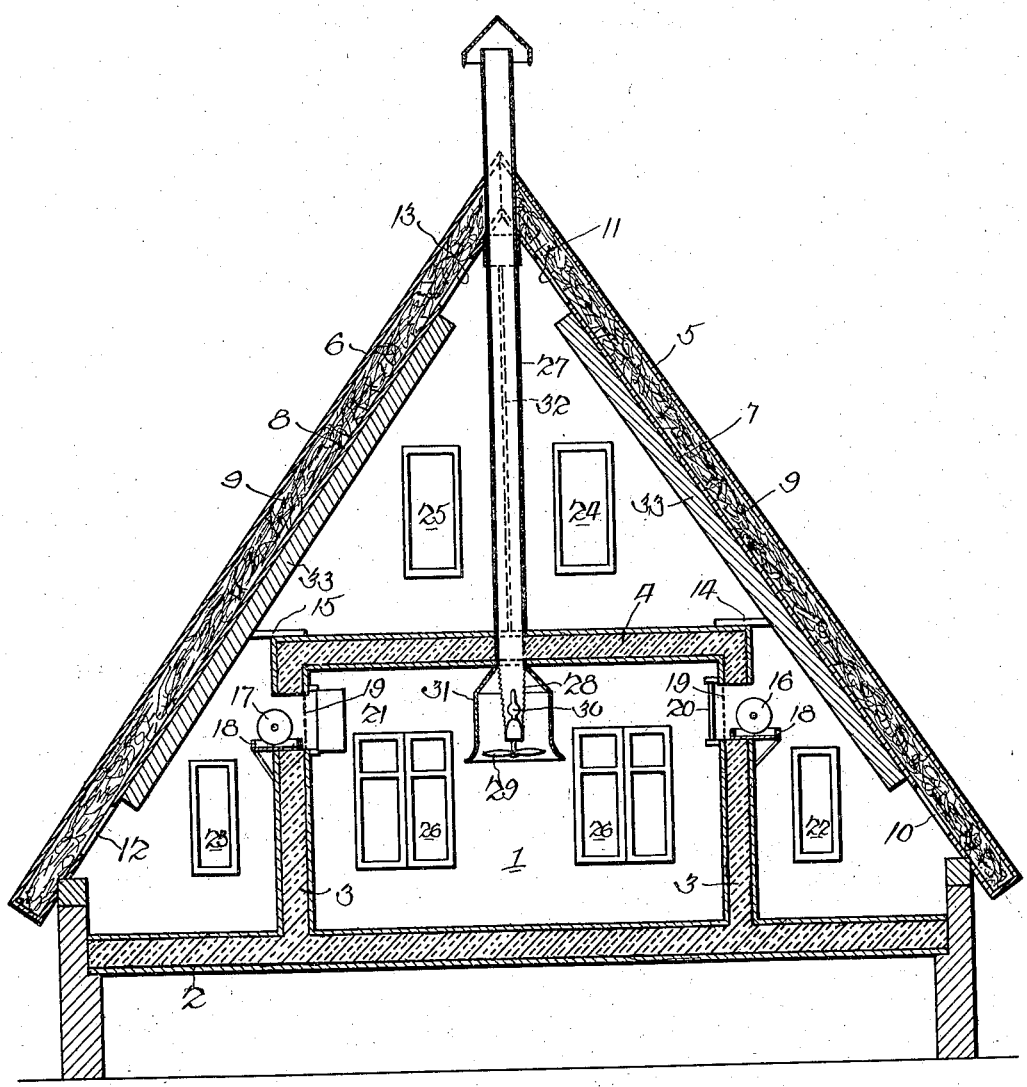

2,138,690

UNITED STATES PATENT OFFICE 2,138,690

METHOD FOR THE DEHUMIDIFICATION OF AIR

Edmund Altenkirch, Neuenhagen, near Berlin, Germany

Application October 18, 1934, Serial No. 748,975
In Germany October 19, 1933

27 Claims. (Cl. 62—176)

It is desirable on hot days and in tropical regions to have a cooled and well conditioned sleeping room at least during the night time. Now, it is known that dried air can be cooled by evaporation of water. In many cases, however, the night air is not dry enough for this purpose, and the artificial drying of the air with known means is very expensive.

It is one object of the present invention to dry air with the aid of solid hygroscopic substances which, after being saturated, are regenerated by another quantity of air under the influence of the sun radiation. In this way effective cooling effect can be produced, practically without any cost, particularly during the night time.

If the dehumidification of the air takes place during the night time exclusively, the hygroscopic substances can be exposed, if desired, to the regeneration by the sun radiation during the whole day time and can be adapted to the changing position of the sun by changing their own position. For this purpose movable devices are of course necessary.

If the hygroscopic substances are arranged approximately horizontally, the sun is effective almost during the whole day and particularly at noon, and this position is, therefore, particularly adapted for the dehumidification of the air during the night. If the dehumidification of the air is desired also during the day time, care has to be taken that the hygroscopic substances are arranged in the shade during the dehumidification of the air.

If the solid hygroscopic substances are arranged vertically, in a direction from north to south, the sun is effective at the east side in the forenoon and at the west side in the afternoon, while the regeneration is interrupted at noon. This position, is therefore also adapted for the dehumidification of the air during the day time, if the east side is separated from the west side by heat insulating walls so that always one part of the hygroscopic substances is located in the shade while the other is exposed to the sun.

A dehumidification of the air preferably during the night time but also during some hours of the day can be obtained, if the solid hygroscopic substances are arranged in an inclined position. The inclined position should be preferred to the horizontal position because, in this way, a natural draught of the warmed air in the air conduits can be obtained during the regeneration, the hygroscopic substances being arranged within the air conduits. The inclination allows, moreover, the utilization of the roofs which are exposed to the sun most effectively, the hygroscopic substances being arranged at the roof. The hygroscopic substances, after being regenerated during the day time may serve for the dehumidification of the air during the night time.

The direction of the flow of air through the hygroscopic substances during the dehumidification period should be opposite to the direction during the regeneration period. This can be effected with the aid of a fan or, if there is no fan available, by artificial heating of the air which flows into the atmosphere from the dried or conditioned room through an air conduit.

The invention also contemplates a method and apparatus for utilizing building space otherwise wasted. More specifically, this invention is designed to convert attics into useful living and sleeping quarters. Furthermore, certain parts of the building itself are so related to the air conditioning equipment that they form a part thereof. In order further to utilize waste space, parts of the air conditioning equipment are positioned between the structural members of the building in the walls thereof.

It is a further object of the invention to provide an apparatus and a method whereby attic rooms may be protected from outside temperatures by means of a current of air moving under the influence of solar heat.

Other objects and advantages will be apparent from the following description taken in connection with the accompanying drawing, in which:

The single figure is a vertical cross-sectional view of the attic of a house having means for carrying out the present invention incorporated therein.

As shown on the drawing, the attic of a house is illustrated as provided with a room which is to be furnished, particularly during the night time, with air which is dehumidified and then cooled by evaporation. The fresh air is dehumidified with the aid of solid hygroscopic substances arranged under the roof. The regeneration of the hygroscopic substances is effected under the influence of the sun radiation during the day time in an air current coming directly from the atmosphere and returning to the atmosphere again.

The room to be cooled is illustrated at 1, the room being at the gable side of a house the ridge of the roof of which is arranged in the direction from north to south. The room is furnished with conditioned air during the night time. The room is protected at the bottom against the entrance of heat by heat insulation 2 provided between the wood-work. It is separated from the attic with the aid of the heat insulating walls 3 and the heat insulating ceiling 4. The roof may be made up of wooden boards 5, 6, 7 and 8. The arrangement may be such that channels are formed on each side of the roof, and these channels may be filled with solid hygroscopic substances 9. The hygroscopic substances may consist of wooden shavings which may be made loose and protected against being compressed by screens of wire. The wooden boards 5, 6, 7 and 8 are also hygroscopic and may serve to absorb and give up water even if there is no charge of hygroscopic substances in the channels. This action is, however, considerably increased by the distribution and the larger surface of the shavings. Because the action of the wooden boards is very slow it may even be advantageous to prevent them from absorbing water, as by painting them. Instead of shavings, little wooden sheets can be used, cut at angles to the fibre, the sheets being arranged in little distance from each other in slots parallel to the inclination of the roof. In this manner the resistance to the flow of the air is very small and a large quantity of hygroscopic substances can be provided. The dried material can be stored several days after regeneration. There is therefore no interruption of the cooling effect if the weather is rainy.

The channels formed by the boards 5, 6, 7 and 8 are provided at the top and at the bottom with screens 10, 11, 12 and 13 which allow the air to leave and enter the channels. Shutters 14 and 15 can be moved away to allow a connection between the lower and the upper part of the attic, in case they are used for drying of goods, for instance fruit. A heat insulating layer 33 is provided below the roof.

Numerals 16 and 17 represent discs which can be turned with the aid of an adjustable clock-work. The discs are immersed into a water container 18 and are arranged before openings in the wall 3. These openings are protected by the perforated sheets 19 and can be closed with the aid of the shutters 20 and 21. Numerals 22, 23, 24 and 25 are windows in the attic rooms, 26 are windows in room 1. The latter have to be closed when the room is furnished with conditioned air. The numeral 27 is a chimney or conduit leading from room 1 into the open air. At the lower part of this conduit, a fan 29 is provided, the fan being suspended on a frame 28. The lamp 30, protected by the shade 31 serves to light the room and in addition, increases the air circulation.

The fan and light are preferred constructions for providing positive circulation of air through the rooms to be conditioned. However, it is obvious that portions of the chimney 27 projecting above the gable of the roof are subjected to the influence of solar heat, and will induce a draft of air through the room without the aid of fan 29, light 30, or other heating means.

It is advisable to provide a partition 32 which divides the attic into two parts.

In order to furnish room 1 with conditioned air during the night time, the system may be operated as follows: At sunrise the lid 20 is closed and window 22 opened. The fresh air can then enter the channels at the east side of the roof between the boards 5 and 7 through the window 22 and the opening 10. The air passes through the hygroscopic substances 9 in the channels, the substances being heated by the sun radiation. The warm air, rising in the channels carries the water away which was taken up by the substances during the foregoing night. The substances are regenerated in this way and are prepared for taking up water during the following night.

The moist air flows into the atmosphere through opening 11 and window 24, the higher the position of window 24 the larger the draught of the air. Generally it is advisable to open other windows in the attic in order to effect a steady change of the air because the air leaving opening 11 is very moist, particularly at the beginning of the regeneration period. It is advisable to decrease the moisture content of air in the attic by mixing this air with fresh air, the relative moisture content of which is low during the day time, in order to avoid condensation of water vapour on the walls of the attic. In particularly moist regions the exhaust air has to be led directly into the atmosphere.

As the sun rises higher, the hygroscopic substances are warmed more and more until a decrease of the heating effect takes place at noon. The drying of the hygroscopic substances is continued as long as the absolute humidity of the exhaust air at 11 is higher than that of the fresh air at 10. When this is no longer the case, window 22 is closed. The time for closing this window can be easily determined by test, and the window may be closed automatically at the correct moment. The hygroscopic substances are then cooled and are ready for use in de-humidifying the air for room 1 after lid 20 has been opened. This can be done before sunset.

The west side of the roof can serve for furnishing room 1 with conditioned dry air in the first part of the forenoon, as long as it is located in the shade, in the same way as used during the night. The fresh air enters the channels formed by the boards 6 and 8 through window 25 and opening 13. It is dried with the aid of the hygroscopic substances in the channels and enters the lower attic room at the west side at 12. From here it enters room 1 after having been cooled by the moist discs 17 to a desired degree. The exhaust air is sucked by fan 29 and is blown into the atmosphere through conduit 27. If desired the flow of air can be supported with the aid of the lamp 30. If no fan can be used for instance, if no electricity is available, the draught in channel 27 can be increased by more effective heating means which can be installed in the upper attic.

In the afternoon the sun reaches the west side of the roof and the lid 21 has to be closed and the window 23 opened. The hygroscopic substances provided in the west side of the roof are then regenerated until sunset, when the window 23 is closed again and the hygroscopic substances become cool. Some time after sunset the west side can be used again to dry air for room 1, after lid 21 has been opened.

Because the atmospheric air is relatively dry during the day time, a considerable drying of the hygroscopic substances is obtained under the influence of the sun radiation. The heat necessary for the operation of the process is available without any expense. The quantity of heat which is taken up by a roof like that shown on the drawing may be more than 100,000 kcal. a day.

Due to the cool temperature during the night a thorough dehumidification of the relatively moist night air is obtained thus making a device of the kind described very effective. The device is particularly adapted to the shape of houses. It utilizes the roof which is exposed to the sun radiation, for the drying of the hygroscopic substances during the day time, on the one hand, and for the dehumidification of the air during the night time, on the other hand.

If only drying of the air is desired, the discs 16 and 17 are not moistened.

The room 1 is cooled and shielded from heat on the sunny side of the building by the circulation of air through the conduit between members 5, 6, 7, and 8. The walls of the room are further cooled by contact with the air stream used to regenerate the hygroscopic material. This air stream not only takes up heat from the walls of the room directly, but it prevents the inside of the attic roof from reaching an elevated temperature and radiating heat into the room. This latter result follows from the fact that solar heat absorbed by the roof is utilized to move the air stream and evaporate moisture from the hygroscopic material.

The room 1 can be cooled without moistening of the entering air if the exhaust air is conducted through pipes or conduits which are arranged in heat exchange relation with the circuit of the dried air entering the room, or if they pass under the ceiling of the room, water being evaporated in the pipes or conduits of the exhaust air circuit. The cooling effect, obtained in this way, is transferred to the dry entering air or to the air within the room 1 without moistening the room.

If it is desired to treat goods the taste of which may be easily spoiled, with dried air during the night, the shutters 14 and 15 may be opened after the lids 21 and 20 and the windows 24 and 25 are closed. In this case the dried air flows slowly in a closed cycle through the channels under the roof and through the attic rooms in which the goods to be dried are placed. If the goods are dried in the manner mentioned the aromatic substances are better preserved than by exposing the goods to the sun radiation.

What I claim is the following:

1. The method of conditioning air for use in a room and involving the use of a substantially stationary hygroscopic substance, which includes the steps of passing a current of air periodically over said substance while cooling the same to cause the substance to absorb moisture from the air, conveying the air thus dried to the room to be conditioned and alternately regenerating the hygroscopic substance while it remains in operable position by exposing the same to the heat of the sun while passing an independent current of air over the same thereby enabling the heat of the sun to cause the moisture to evaporate from the substance into the air in said independent current.

2. The method of conditioning air for use in a room and involving the use of a hygroscopic substance, which includes the steps of passing a current of air periodically over said substance while cooling the same to cause the substance to absorb moisture from the air, conveying the air thus dried to the room to be conditioned and alternately regenerating the hygroscopic substance while it remains in operable position by exposing the same to the heat of the sun while passing an independent current of air over the same thereby enabling the heat of the sun to cause the moisture to evaporate from the substance into the air in said independent current, the passage of air over said substance in said independent regenerating current being induced at least partly, by the influence of gravity on the air resulting from the heating thereof by the sun.

3. The method of conditioning air for use in a room and involving the use of a hygroscopic substance, which includes the steps of passing a current of air periodically over said substance while cooling the same to cause the substance to absorb moisture from the air, conveying the air thus dried to the room to be conditioned and alternately regenerating the hygroscopic substance while it remains in operable position by exposing the same to the heat of the sun while passing an independent current of air over the same thereby enabling the heat of the sun to cause the moisture to evaporate from the substance into the air in said independent current, the passage of air over said substance and to the room, while the substance is drying the air being induced, at least partly, by the influence of gravity on the air resulting from artificially heating a column of air after it has passed through the room.

4. The method of conditioning air for use in a room and involving the use of a hygroscopic substance, which includes the steps of drying air periodically by passing a current of air over said substance while cooling the substance to cause the substance to absorb moisture from the air, conveying the air thus dried into heat transfer relation with a body cooled by evaporation of water, conveying the air thus dried and cooled into the room to be conditioned and alternately regenerating the hygroscopic substance while it remains in operable position by exposing the same to the heat of the sun while passing an independent current of air over the same thereby enabling the heat of the sun to cause moisture to evaporate from the substance into the air in said independent current.

5. An apparatus for conditioning air for a room including a body of hygroscopic substance, means for passing a current of air over the substance to cause the substance to absorb moisture from the air, means for conveying the air thus dried to the room to be conditioned, and means for passing an independent current of air over the substance while said substance remains in the apparatus to regenerate the substance by causing the moisture to evaporate therefrom, the arrangement being such that the substance may be cooled when absorbing moisture from the air and exposed to the heat of the sun when moisture is being evaporated therefrom.

6. An apparatus for conditioning air for a room including a body of hygroscopic substance, means for passing a current of air over the substance to cause the substance to absorb moisture from the air, means for conveying the air thus dried to the room to be conditioned, and means for passing a current of air over the substance to regenerate the substance by causing the moisture to evaporate therefrom, the arrangement being such that the substance may be cooled when absorbing moisture from the air and exposed to the heat of the sun when moisture is being evaporated therefrom, said hygroscopic substance being disposed directly beneath the inclined roof of a building.

7. An apparatus for conditioning air for a room including a body of hygroscopic substance, means for passing a current of air over the substance to cause the substance to absorb moisture from the air, means for conveying the air thus dried to the room to be conditioned, and means for passing a current of air over the substance to regenerate the substance by causing the moisture to evaporate therefrom, the arrangement being such that the substance may be cooled when absorbing moisture from the air and exposed to the heat of the sun when moisture is being evaporated therefrom, said hygroscopic substance being disposed in channels in the roof of the attic of a building and said building having openings therein adapted to connect the space in the attic to the open atmosphere.

8. An apparatus for conditioning air for a room including a body of hygroscopic substance, means for passing a current of air over the substance to cause the substance to absorb moisture from the air, means for conveying the air thus dried to the room to be conditioned, and means for passing an independent current of air over the substance while the substance remains in said apparatus to regenerate the substance by causing the moisture to evaporate therefrom, the arrangement being such that the substance may be cooled when absorbing moisture from the air and exposed to the heat of the sun when moisture is being evaporated therefrom, said hygroscopic substance consisting of small pieces of wood cut at an angle to the fibers thereof.

9. The method of providing conditioned air for a space which comprises passing air over hygroscopic material shielded from the sun to dry the air, evaporating water into the dried air to cool the same, conducting the air to the space to be conditioned and employing electrical energy to illuminate said space and to create a stream of warm rising air leading from said space to ventilate said space and to draw additional air over said material.

10. The method of providing conditioned air for a space which comprises passing air over hygroscopic material shielded from the sun to dry the air, evaporating water into the dried air to cool the same, conducting the air to the space to be conditioned, employing electrical energy to illuminate the space, and forming a column of rising air leading from said space to promote the circulation of air therethrough, the flow of air in said column being augmented by heat derived from said illumination and from solar energy.

11. The method of air conditioning a building constructed at least in part of hygroscopic material which comprises the steps of directing a current of air over portions of the building made of said hygroscopic material to dry the air, directing the dried air into the useful space in the building, venting the useful space in the building, and regenerating the hygroscopic material by the application of heat.

12. The method of conditioning the air in a building constructed at least in part of hygroscopic material which comprises the steps of directing incoming air into contact with portions of the building walls containing hygroscopic material and which are not exposed to sunlight to dry the air, cooling and moistening the dried air, venting the building by applying heat to a rising column of used conditioned air, and regenerating the portions of the building exposed to sunlight by application of solar heat and contact with a moving vented air stream.

13. The method of conditioning air for use in a room, which includes the steps of passing an air current over hygroscopic material while cooling the air to remove moisture therefrom, conveying the dried air to the room to be conditioned, and inducing air flow across the hygroscopic material and through the room by subjecting part of the air stream to solar heat out of contact with hygroscopic material.

14. The method of conditioning air for use in a room and alternately utilizing separate portions of hygroscopic material, a part of which is exposed to the sun and a part of which is shielded from the sun which method comprises the steps of contacting activated hygroscopic material not exposed to solar heat with air to be conditioned to dry the air, cooling the dried air, conveying the conditioned air into the room to be air conditioned, venting the air from the room, reactivating that portion of the hygroscopic material exposed to the sun by solar heat and in contact with a moving independent air current and inducing flow of said air currents by subjecting them to solar heat.

15. A method of air conditioning a room involving the use of hygroscopic material which includes contacting activated hygroscopic material protected from solar heat with air to be conditioned to dry the air, cooling and moistening the air, conveying the conditioned air to the room to be conditioned, venting used conditioned air from the room, conveying a current of air into contact with certain walls of the room to absorb heat therefrom, and conveying the last mentioned air current into contact with hygroscopic material subjected to solar heat to reactivate the same and subsequently using the hygroscopic material so reactivated to dry air for said room and then reactivating the hygroscopic material which has been saturated in drying air for the room.

16. A structure rendering an attic useful and subject to human habitation comprising a room built into the attic, means forming air ducts in the attic roof having inlets and outlets into the attic, means communicating the attic with the outside atmosphere, hygroscopic material in said ducts, means communicating the attic and said room, and means venting said room to atmosphere, whereby the hygroscopic material in shaded portions of the attic roof dries and conditions air for the room and the hygroscopic material in other portions of the roof is regenerated by solar heat.

17. Means rendering attics useful as human habitations comprising, an insulated room built into the attic and spaced from the walls thereof, means venting said room to the atmosphere, a vertical wall extending from the top of wall of the room to the top of the attic dividing said attic into two parts, means coacting with the walls of said room dividing each of said parts into upper and lower portions, means forming conduits in the attic walls, each conduit communicating with the upper and lower portions of one of said parts of the attic, means providing communication between the atmosphere and each upper and lower portion of the attic, whereby said room is maintained relatively cool by air currents entering the lower portions of the attic, passing through said air conduits and exiting from the upper portions of the attic.

18. That method of drying air which comprises passing atmospheric air over a first body of hygroscopic material shielded from the heat of the sun to dry the air, passing the air so conditioned to a space to be conditioned, passing other atmospheric air over a second body of moist hygroscopic material subject to the heat of the sun independently of said first mentioned air whereby said moist material is reactivated for subsequent use in conditioning air for said space, said bodies of material being so arranged that after the sun has passed the meridian the first body of hygroscopic material is shielded from the sun, and the second body is heated whereby the flow of air over said material is reversed, so that the first body is reactivated and the second body serves to condition the air for said space.

19. That method of conditioning a space which includes passing a stream of air over a first body of hygroscopic material shielded from the heat of the sun to dry the air, passing the dried air to the space to be conditioned while exhausting vitiated air therefrom, passing an independent stream of air over a second body of moist hygroscopic material subject to the heat of the sun whereby the same is reactivated for subsequent use in drying air for said space, said method being so carried out that said second body of material is periodically shielded from the sun and the first body is periodically heated by the sun without removing either of said bodies of hygroscopic material, and the dry air stream delivered by the shielded body is delivered to said space.

20. That method of conditioning air which includes passing a stream of air over a first body of absorbent material protected from the heat of the sun whereby the air is dried, modifying another condition of the air, conducting the air so conditioned to a vented space to be conditioned, the circulation of the air being produced by the difference in the specific gravity of different portions of said stream, passing a separate stream of air over a second body of moist absorbent material subject to the heat of the sun to reactivate said material, and then protecting said second body from the heat of the sun and utilizing the same to dry air for said space while the first body of material is being reactivated by the heat of the sun.

21. That method of conditioning air by energy obtained from the sun which includes reducing the vapor content of air by passing a stream thereof over absorbent material in the night time, dissipating the heat of absorption to the atmosphere, reducing the temperature of the partially dried air, conducting the air so conditioned to an enclosed space, discontinuing the supply of conditioned air to said space during the day time and reactivating said material by passing air thereover and liberating the water therein by heat energy received from the sun whereby said material is again rendered suitable for conditioning air for said space after sundown, said method being carried out without removing said absorbent material.

22. An apparatus for conditioning air solely by energy derived from the sun comprising a plurality of chambers containing hygroscopic material, said chambers being so arranged that when the morning sun strikes one chamber the other is shielded therefrom, and in the afternoon the sun strikes said other chamber, while said one chamber is shielded from the sun, openings at the lower and upper ends of each of the chambers for the passage of air through said chambers, means forming a chamber to be conditioned in optional communication with the lower opening of each of said first named chambers, said openings in the upper ends of the chambers being in communication with the atmosphere, and means controlling the independent flow of atmospheric air through each of said chambers whereby the chamber being heated by the sun acts to regenerate moist hygroscopic material, and the chamber not heated by the sun acts to condition air for said chamber being conditioned.

23. Apparatus for conditioning an enclosure comprising hygroscopic means forming at least a part of the enclosure and a passageway for atmospheric air, said passageway communicating with the atmosphere at one end and with the interior of the enclosure at its opposite end, and a vent from said enclosure whereby atmospheric air is dried as it passes through said passageway to the interior of said enclosure to condition the same, and other air is vented from the enclosure.

24. A combined building and air conditioner comprising means forming a building having hollow walls in part, widely spaced openings in said hollow walls some of which communicate with the atmosphere, and others of which communicate with the interior of the building, hygroscopic material within and including in part some of the material forming said walls, said openings being so arranged that humid atmospheric air may pass from the atmosphere through said hollow walls where it is dehumidified by said hygroscopic material and then into said building.

25. A combined building and air conditioner therefor comprising a building having a plurality of walls including a roof and certain of which walls are hollow, hygroscopic material within and including in part the material forming said walls, and means providing communication between said hollow walls, the interior of the building and the atmosphere, whereby when certain of said openings are uncovered atmospheric air flows over the hygroscopic material to be dried and then into the interior of the building to condition the same when the sun is not shining on the walls of said building, and whereby when the sun is shining upon the walls to heat the same the moisture previously absorbed by the hygroscopic material is liberated and passes into the atmosphere.

26. A combined building and air conditioner therefor comprising a building having a hollow walled roof part of which faces to the west and a part of which faces east, hygroscopic material within and including in part the material forming said roof, openings from each side of the roof at the upper and lower portions thereof, the upper openings communicating with the atmosphere and the lower openings communicating with the interior of the building, and means for controlling the flow of air through each of said roof parts whereby humid atmospheric air is dried as it flows downwardly over the hygroscopic material and into the interior of the building through that side of the roof on which the sun is not shining, and whereby the hygroscopic material on the side on which the sun shines is regenerated by the passage of air thereover as the sun heats the same to drive out the moisture.

27. That improvement in air conditioners of the type built into the wall of a building facing the sun during a part of the day and containing hygroscopic material for the purpose of drying air for the interior of the building, which improvement comprises regenerating said material after its effectiveness in drying air has been materially reduced by passing a stream of air derived directly from the atmosphere over said material while the sun is shining on said wall whereby the heat of the sun liberates the water in said material and the same is carried away by said atmospheric air stream.

EDMUND ALTENKIRCH.